United States Patent Office 3,470,161
Patented Sept. 30, 1969

3,470,161
17-TETRAHYDROFURYLESTRADIOL DERIVATIVES
Yvon Lefebvre, Pierrefonds, Quebec, Canada, assignor to American Home Products Corporation, New York, N.Y., a corporation of Delaware
No Drawing. Filed Sept. 12, 1967, Ser. No. 667,088
Int. Cl. C07c 173/00; A61k 27/00
U.S. Cl. 260—239.55          27 Claims

ABSTRACT OF THE DISCLOSURE

There are disclosed herein the compounds 17α-[2′-tetrahydrofuryl]- and -[3′ - tetrahydrofuryl] - 1,3,5(10)-estratriene-3,17-diol, and their respective 3-acetates, 3-propionates, 3-butanoates, and 3-benzoates, as well as their 3-methoxy, 3-ethoxy, 3-propoxy-, 3-isopropoxy-, 3 - n - butoxy-, 3 - sec.-butoxy-, 3-cyclopentyloxy-, and 3-cyclohexyloxy derivatives. The compounds have anti-inflammatory activities and methods for their preparation and use are also given.

---

This invention relates to new 17-tetrahydrofurylestradiol derivatives and to a method for their preparation.

More specifically, this invention relates to a new class of compounds which may be represented by Formula I

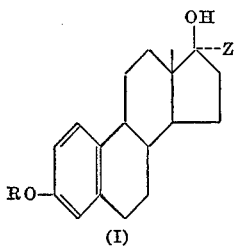

(I)

in which R represents hydrogen, a lower alkyl group containing from 1–4 carbon atoms, a cycloalkyl group containing from 5–6 carbon atoms, or an acyl group such as, for example, the acetyl, propionyl, butanoyl or benzoyl group; Z represents a 2-tetrahydrofuryl or a 3-tetrahydrofuryl group.

The 17-tetrahydrofurylestradiol derivatives of this invention possess anti-inflammatory as well as hypocholesteremic activity.

These derivatives are useful as anti-inflammatory agents when administered orally or by injection. They may be administered orally in the form of tablets or capsules containing from 5 to 500 mg. of the active ingredient or by injection in the form of pharmaceutically acceptable sterile solutions or suspensions in pharmaceutically acceptable vehicles containing from 5 to 500 mg. of the active ingredient per unit dosage form as required.

We prefer to use as starting materials for our invention the 17-furyl derivatives of Formula II in which R is as defined above

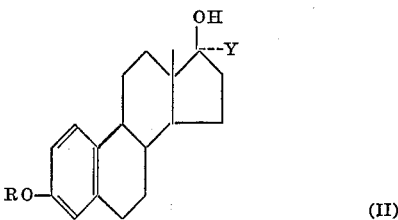

(II)

and Y represents a 2-furyl or 3-furyl group.

The starting materials of Formula II in which Y represents a 2-furyl group may be obtained by the reaction of an appropriate 17-keto derivative with 2-furyllithium as described in my co-pending U.S. patent application, S.N. 563,682, filed July 8, 1966, now abandoned, viz, the compounds of Formula III

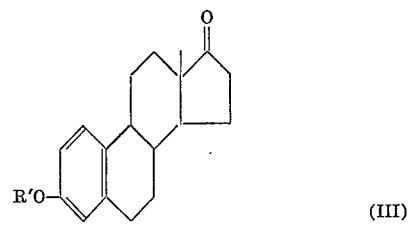

(III)

in which R′ represents an alkyl group containing from 1–4 carbon atoms, a cycloalkyl group containing from 5–6 carbon atoms or a tetrahydropyranyl group which are all described in U.S. Pat. No. 3,271,392, are reacted with 2-furyllithium in a mixture of ether-toluene at room temperature to yield the corresponding starting materials of Formula II in which R represents an alkyl group containing from 1–4 carbon atoms, a cycloalkyl group containing from 5–6 carbon atoms or a tetrahydropyranyl group. Furthermore, the 3-tetrahydropyranyl derivatives of Formula II, thus obtained can be readily hydrolyzed in dilute methanolic hydrochloric acid to yield the corresponding 3 - hydroxy derivative, 17α - [2′ - furyl]-1,3,5 (10)-estratriene-3,17-diol, (i.e., the compound represented by Formula II in which R is hydrogen and Y is a 2-furyl group). The 3-hydroxy group of the latter compound may be preferentially acylated with an appropriate acid anhydride or acid halide in the presence of a basic solvent at room temperature to afford the starting materials of Formula II in which R represents an acyl group and Y represents a 2-furyl group.

The starting materials of Formula II in which Y represents a 3-furyl group are described in U.S. Patent No. 3,271,392.

In practising this invention the starting materials of Formula II are subjected to catalytic hydrogenation utilizing two moles of hydrogen to yield the new 17-tetrahydrofurylestradiol derivatives of this invention. Although the catalytic hydrogenation of a furan ring may be accomplished by using a variety of metal catalysts such as, nickel, ruthenium, palladium, osmium or platinum catalysts (see A. P. Dunlup and F. N. Peters, "The Furans," Am. Chem. Soc. Monograph Series, Reinhold Publishing Corp., 1953, pp. 674–713), in the presence of a great variety of inert solvents such as, for example, ethanol, methanol, ethyl acetate, or dioxane. I have found that excellent yields of the products of this invention are obtained when the starting materials of Formula II are hydrogenated with two moles of hydrogen in a Parr hydrogenation apparatus in the presence of palladium-calcium carbonate catalyst, using ethyl acetate as the solvent.

The following examples will illustrate the scope of my invention.

Example 1

A mixture of 17α-[3′-furyl]-3-methoxy-1,3,5(10)-estratrien-17-ol (10 g.), described in U.S. Patent No. 3,271,-392, ethyl acetate (200 ml.), and pre-hydrogenated 5% palladium on calcium carbonate (10 g.) is hydrogenated at room temperature and at normal pressure for 20 hours. The catalyst is filtered and the filtrate is evaporated to dryness. The residue is chromatographed on alumina and the fractions eluted with mixtures of benzene-hexane and benzene are combined and crystallized from acetone-hexane to yield 3-methoxy-17α[3′-tetrahydrofuryl]-1,3,-5(10)-estratrien-17-ol, M.P. 127–128° C.

Example 2

In a similar manner as described in Example 1, hydrogenation of 3-ethoxy-17α-[3'-furyl]-1,3,5(10)-estratrien-17-ol,
17α-[3'-furyl]-3-propoxy-1,3,5(10)-estratrien-17-ol,
17α-[3'-furyl]-3-isopropoxy-1,3,5(10)-estratrien-17-ol,
3-n-butoxy-17α-[3'-furyl]-1,3,5(10)-estratrien-17-ol,
3-sec.-butoxy-17α-[3'-furyl]-1,3,5(10)-estratrien-17-ol,
3-cyclopentyloxy-17α-[3'-furyl]-1,3,5(10)-estratrien-17-ol,
3-cyclohexyloxy-17α-[3'-furyl]-1,3,5(10)-estratrien-17-ol, and
17α - [3' - furyl] - 1,3,5(10) - estratriene - 3,17 - diol,
described in U.S. Patent No. 3,271,392, yields respectively:
3-ethoxy-17α-[3'-tetrahydrofuryl]-1,3,5(10)-estratrien-17-ol,
3-propoxy-17α-[3'-tetrahydrofuryl]-1,3,5(10)-estratrien-17-ol,
3-isopropoxy-17α-[3'-tetrahydrofuryl]-1,3,5(10)-estratrien-17-ol,
3-n-butoxy-17α-[3'-tetrahydrofuryl]-1,3,5(10)-estratrien-17-ol,
3-sec.-butoxy-17α-[3'-tetrahydrofuryl]-1,3,5(10)-estratrien-17-ol,
3-cyclopentyloxy-17α-[3'-tetrahydrofuryl]-1,3,5(10)-estratrien-17-ol,
3-cyclohexyloxy-17α-[3'-tetrahydrofuryl]-1,3,5(10)-estratrien-17-ol, and
17α-[3'-tetrahydrofuryl]-1,3,5(10)-estratriene-3,17-diol.

Example 3

By the same procedure as described in Example 1, 3-acetoxy-17α-[3'-furyl]-1,3,5(10)-estratrien-17-ol,
17α-[3'-furyl]-3-propionyloxy-1,3,5(10)-estratrien-17-ol,
3 - butanoyloxy - 17α - [3' -furyl] - 1,3,5(10) - estratrien-17-ol, and
3 - benzoyloxy - 17α - [3' - furyl] - 1,3,5(10) - estratrien-17-ol, described in U.S. Patent No. 3,271,392, are respectively transformed by catalytic hydrogenation into 3-acetoxy-17α-[3'-tetrahydrofuryl]-1,3,5(10)-estratrien-17-ol,
3-propionyloxy-17α-[3'-tetrahydrofuryl]-1,3,5(10)-estratrien-17-ol,
3-butanoyloxy-17α-[3'-tetrahydrofuryl]-1,3,5(10)-estratrien-17-ol, and
3-benzoyloxy-17α-[3'-tetrahydrofuryl]-1,3,5(10)-estratrien-17-ol.

Example 4

A mixture of 17α-[2'-furyl]-3-methoxy-1,3,5(10)-estratrien-17-ol (3.7 g.), described in my co-pending U.S. patent application S. N. 563,682, filed July 8, 1966, ethyl acetate (148 ml.) and pre-hydrogenated 5% palladium on calcium carbonate is hydrogenated at room temperature and at normal pressure for 20 hours. The catalyst is filtered and the filtrate is evaporated to dryness. The residue is chromatographed on alumina and the fractions di- eluted with mixtures of benzene and hexane are combined and crystallized from hexane to yield 3-methoxy-17α-[2'-tetrahydrofuryl]-1,3,5(10)-estratrien - 17 - ol M.P. 102–103° C.

Example 5

By a procedure similar to the one described in Example 4, 3-ethoxy-17α-[2'-furyl]-1,3,5(10)-estratrien-17-ol,
17α-[2'-furyl]-3-propoxy-1,3,5(10)-estratrien-17-ol,
17α-[2'-furyl]-3-isopropoxy-1,3,5(10)-estratrien-17-ol,
3-n-butoxy-17α-[2'-furyl]-1,3,5(10)-estratrien-17-ol,
3-sec.-butoxy-17α-[2'-furyl]-1,3,5(10)-estratrien-17-ol,
3-cyclopentyloxy-17α-[2'-furyl]-1,3,5(10)-estratrien-17-ol,
3-cyclohexyloxy-17α-[2'-furyl]-1,3,5(10)-estratrien-17-ol, and
17α - [2' - furyl] - 1,3,5(10) - estratriene - 3,17 - diol, described in my co-pending U.S. patent application S. N. 563,682 filed July 8, 1966, are transformed respectively into 3-ethoxy-17α-[2'-tetrahydrofuryl]-1,3,5(10)-estratrien-17-ol,
3-propoxy-17α-[2'-tetrahydrofuryl]-1,3,5(10)-estratrien-17-ol,
3-isopropoxy-17α-[2'-tetrahydrofuryl]-1,3,5(10)-estratrien-17-ol,
3-n-butoxy-17α-[2'-tetrahydrofuryl]-1,3,5(10)-estratrien-17-ol,
3-sec.-butoxy-17α-[2'-tetrahydrofuryl]-1,3,5(10)-estratrien-17-ol,
3-cyclopentyloxy-17α-[2'-tetrahydrofuryl]-1,3,5(10)-estratrien-17-ol,
3-cyclohexyloxy-17α-[2'-tetrahydrofuryl]-1,3,5(10)-estratrien-17-ol, and
17α-[2'-tetrahydrofuryl]-1,3,5(10)-estratriene-3,17-diol,
by catalytic hydrogenation.

Example 6

By the same procedure described in Example 4, hydrogenation of 3-acetoxy-17α-[2'-furyl]-1,3,5(10)-estratrien-17-ol,
17α-[2'-furyl]-3-propionyloxy-1,3,5(10)-estratrien-17-ol,
3-butanoyloxy-17α-[2'-furyl]-1,3,5(10)-estratrien-17-ol, and
3 - benzoyloxy - 17α - [2' - furyl] - 1,3,5 (10) - estratrien-17-ol, described in my co-pending U.S. patent application S. N. 563,682, filed July 8, 1966, yields respectively 3-acetoxy-17α-[2'-tetrahydrofuryl]-1,3,5(10)-estratrien-17-ol,
3-propionyloxy-17α-[2'-tetrahydrofuryl]-1,3,5(10)-estratrien-17-ol,
3-butanoyloxy-17α-[2'-tetrahydrofuryl]-1,3,5(10)-estratrien-17-ol, and
3-benzoyloxy-17α-[2'-tetrahydrofuryl]-1,3,5(10)-estratrien-17-ol.

I claim:

1. Compounds of the formula

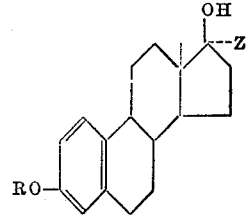

wherein R is selected from the group which consists of hydrogen, lower alkyl, cycloalkyl containing from 5 to 6 carbon atoms and acyl; and Z is selected from the 2-tetrahydrofuryl and 3-tetrahydrofuryl groups.

2. 3 - methoxy - 17α - [3' - tetrahydrofuryl]-1,3,5(10)-estratrien-17-ol, as claimed in claim 1.

3. 3 - ethoxy - 17α - [3' - tetrahydrofuryl] - 1,3,5(10)-estratrien-17-ol, as claimed in claim 1.

4. 3 - propoxy - 17α-[3' - tetrahydrofuryl] - 1,3,5(10)-estratrien-17-ol, as claimed in claim 1.

5. 3-isopropoxy - 17α - [3'-tetrahydrofuryl]-1,3,5(10)-estratrien-17-ol, as claimed in claim 1.

6. 3 - n - butoxy - 17α - [3' - tetrahydrofuryl]-1,3,5(10)-estratrien-17-ol, as claimed in claim 1.

7. 3 - sec - butoxy-17α-[3'-tetrahydrofuryl]-1,3,5(10)-estratrien-17-ol, as claimed in claim 1.

8. 3 - cyclopentyloxy - 17α - [3' - tetrahydrofuryl] - 1,3,5(10)-estratrien-17-ol, as claimed in claim 1.

9. 3 - cyclohexyloxy - 17α - [3' - tetrahydrofuryl] - 1,3,5(10)-estratrien-17-ol, as claimed in claim 1.

10. 17α - [3' - tetrahydrofuryl] - 1,3,5(10) - estratrien-3,17-diol, as claimed in claim 1.

11. 3 - acetoxy - 17α - [3' - tetrahydrofuryl] - 1,3,5 (10)-estratrien-17-ol, as claimed in claim 1.

12. 3 - propionyloxy - 17α - [3' - tetrahydrofuryl] - 1, 3,5(10)-estratrien-17-ol, as claimed in claim 1.

13. 3 - butanoyloxy - 17α - [3' - tetrahydrofuryl] - 1,3,5(10)-estratrien-17-ol, claimed in claim 1.
14. 3 - benzoyloxy - 17α - [3' - tetrahydrofuryl] - 1,3,5(10)-estratrien-17-ol, as claimed in claim 1.
15. 3 - methoxy - 17α - [2' - tetrahydrofuryl] - 1,3,5(10)-estratrien-17-ol, as claimed in claim 1.
16. 3 - ethoxy - 17α - [2' - tetrahydrofuryl] - 1,3,5(10)-estratrien-17-ol, as claimed in claim 1.
17. 3 - propoxy - 17α - [2' - tetrahydrofuryl] - 1,3,5(10)-estratrien-17-ol, as claimed in claim 1.
18. 3 - isopropoxy - 17α - [2' - tetrahydrofuryl] - 1,3,5(10)-estratrien-17-ol, as claimed in claim 1.
19. 3 - n - butoxy - 17α - [2' - tetrahydrofuryl] - 1,3,5(10)-estratrien-17-ol, as claimed in claim 1.
20. 3 - sec - butoxy - 17α - [2' - tetrahydrofuryl] - 1,3,5(10)-estratrien-17-ol, as claimed in claim 1.
21. 3 - cyclopentyloxy - 17α - [2' - tetrahydrofuryl]-1,3,5(10)-estratrien-17-ol, as claimed in claim 1.
22. 3 - cyclohexyloxy - 17α - [2' - tetrahydrofuryl] - 1,3,5(10)estratrien-17-ol, as claimed in claim 1.
23. 17α - [2' - tetrahydrofuryl] - 1,3,5(10) - estratriene-3,17-diol, as claimed in claim 1.
24. 3 - acetoxy - 17α - [2' - tetrahydrofuryl] - 1,3,5(10)-estratrien-17-ol, as claimed in claim 1.
25. 3 - propionyloxy - 17α - [2' - tetrahydrofuryl] - 1,3,5(10)-estratrien-17-ol, as claimed in claim 1.
26. 3 - butanoyloxy - 17α - [2' - tetrahydrofuryl] - 1,3,5(10)-estratrien-17-ol, as claimed in claim 1.
27. 3 - benzoyloxy - 17α - [2' - tetrahydrofuryl] - 1,3,5(10)-estratrien-17-ol, as claimed in claim 1.

References Cited
UNITED STATES PATENTS 3,271,392   9/1966   Lefebvre _____ 260—239.55

LEWIS GOTTS, Primary Examiner
ETHEL G. LOVE, Assistant Examiner

U.S. Cl. X.R.

260—999